United States Patent
Kadambi et al.

[11] Patent Number: 5,838,688
[45] Date of Patent: Nov. 17, 1998

[54] DETERMINING THE NUMBER OF ACTIVE NUDES ON AN ETHERNET NETWORK BY COUNTING A NUMBER OF PACKET RECEPTIONS

[75] Inventors: Jayant Kadambi, Milpitas; Mohan Kalkunte, Sunnyvale; Jim Mangin, San Ramon, all of Calif.

[73] Assignee: Advanced Micro Devices, Inc., Sunnyvale, Calif.

[21] Appl. No.: 730,725

[22] Filed: Oct. 11, 1996

[51] Int. Cl.[6] ............................................ H04B 7/14
[52] U.S. Cl. ................... 370/445; 370/447; 370/448; 395/200.55
[58] Field of Search ................... 370/445, 447, 370/448; 395/200.55

[56] References Cited

U.S. PATENT DOCUMENTS

| | | | |
|---|---|---|---|
| 5,430,732 | 7/1995 | Lee et al. | 370/95.1 |
| 5,436,903 | 7/1995 | Yang et al. | 370/85.3 |
| 5,526,355 | 6/1996 | Yang et al. | 370/85.3 |
| 5,642,360 | 6/1997 | Trainin | 370/730 |
| 5,650,997 | 7/1997 | Yang et al. | 370/448 |
| 5,699,515 | 12/1997 | Berkema et al. | 395/200.06 |

OTHER PUBLICATIONS

AMD, AM79C791 PCnet™–Fast, Single–Chip Full–Duplex 10/100 Mbps Ethernet Controller to PCI Local Bus, Preliminary Data Sheet Publication #20550, Rev. B, May 1996.

Breyer et al., "Switched and Fast Ethernet: How It Works and How to Use It", Ziff–Davis Press, Emeryville, CA (1995), pp. 60–70.

Johnson, "Fast Ethernet: Dawn of a New Network", Prentice–Hall, Inc. (1996), pp. 158–175.

Primary Examiner—Lance Leonard Barry

[57] ABSTRACT

Delay times are modified in Ethernet network devices by adding an integer multiple of a delay interval to the minimum interpacket gap (IPG) interval, and decrementing a deferral counter storing the integer in each network station in response to detected activity on the media. Each station independently determines the number of stations active on the network media by counting the number of successful packet receptions following a corresponding detected collision. Once the number of detected collisions equals the number of stations (N) minus one, each station independently establishes a unique integer value from the range of zero to the number of detected collisions, i.e., up to the number of stations (N) minus one, by resetting the deferral counter to (N−1) after a successful transmission, and by decrementing the deferral counter upon detection of a successful transmission without collision by another station. The unique integer value ensures that each station has a different delay interval in accessing the media after sensing deassertion of the receive carrier. Each network station also includes a deferral timer that counts the maximum delay interval of (N−1) delay intervals plus the minimum IPG value, and thus establishes a bounded access latency for a half-duplex shared network.

28 Claims, 8 Drawing Sheets

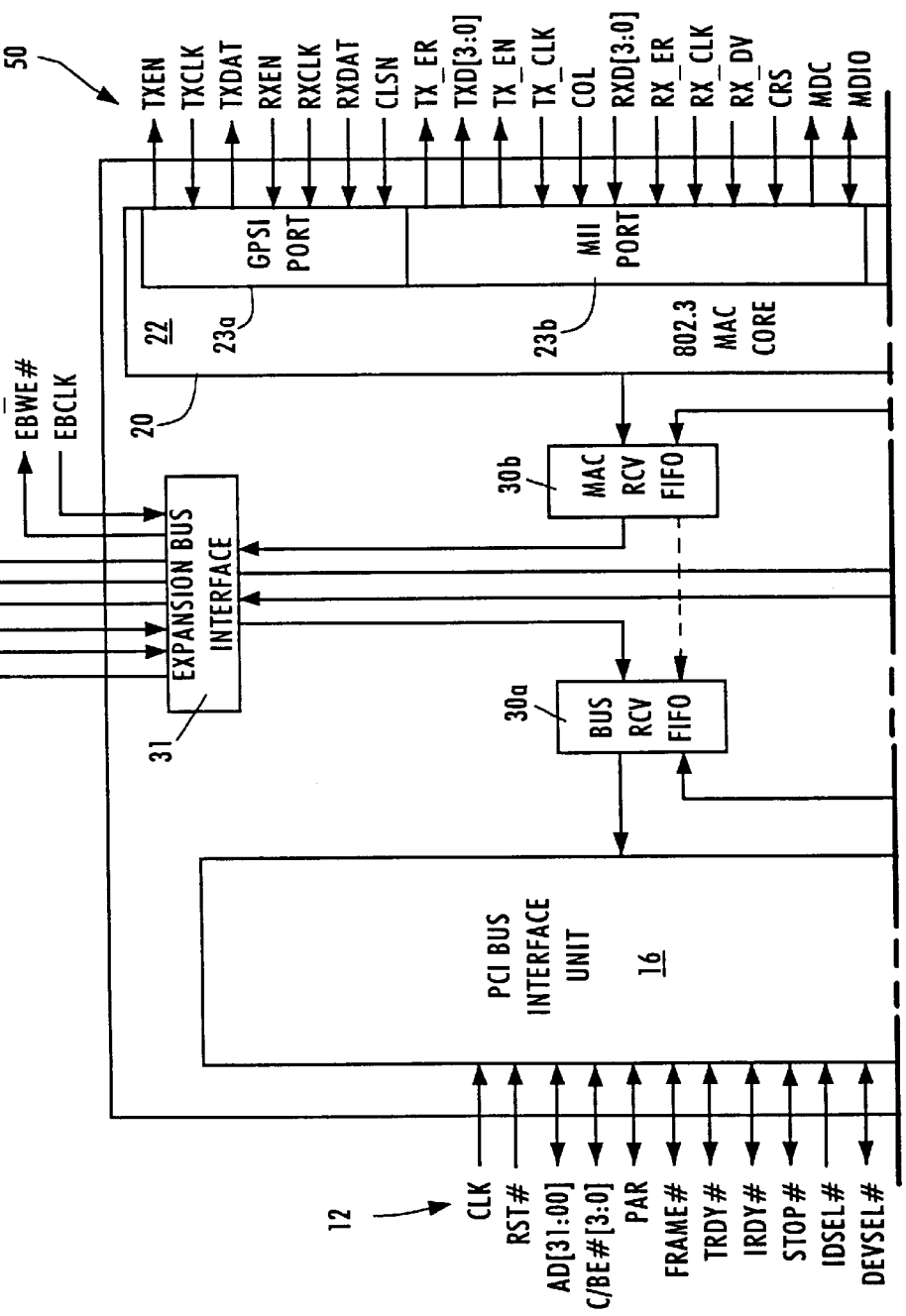

Figure 4
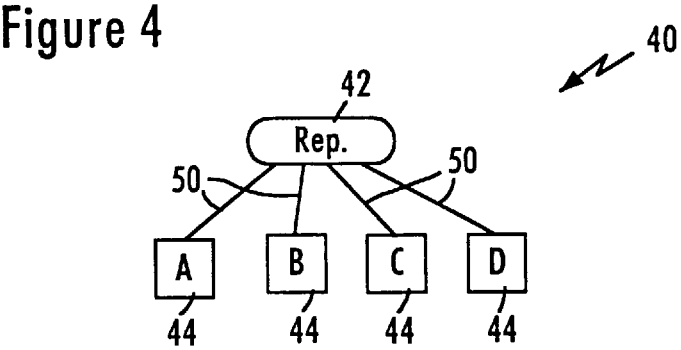
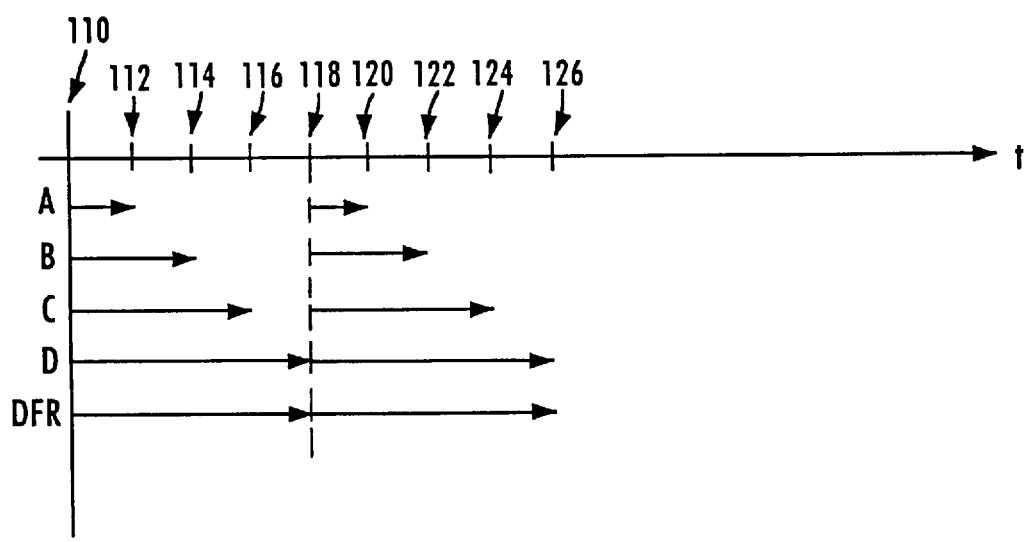
Figure 5

5,838,688

DETERMINING THE NUMBER OF ACTIVE NUDES ON AN ETHERNET NETWORK BY COUNTING A NUMBER OF PACKET RECEPTIONS

TECHNICAL FIELD

The present invention relates to network interfacing and more particularly, to methods and systems efficiently accessing Ethernet media.

BACKGROUND ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j=3, then the range of randomly selected time slots is (0,7); if the randomly-selected number of time slots is four, then the collision backoff interval will be equal to four slot time intervals. According to Ethernet protocol, the maximum range of randomly selected time slots is $2^{10}-1$.

The truncated binary exponential algorithm has the disadvantage that a new station that has data to transmit has a higher probability of winning a collision mediation than a station having encountered a greater number of transmission attempts. This effect is known as the capture effect, where a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot be supported on half-duplex networks. Collision mediation also causes a substantial reduction in throughput on higher data rate networks having transmission rates, for example, of 100 megabits per second (Mbit/s) or 1000 Mbit/s.

Alternative network architectures have relied upon an external control mechanism that controls access to the shared medium. For example, a token ring network passes a token in a sequential manner to network stations. A station that acquires the token has the right to transmit on the network. Upon completion of the transmission, the token is passed on to the next station. The passing of the token, however, uses up bandwidth on the media. Bandwidth is also wasted if the token is received and then passed by a station that has no data to transmit. Hence, the token ring network limits network throughput because an individual station cannot transmit data until it receives the token, regardless of whether any other station has any data to send.

Another network arrangement specified by IEEE 802.12-1995, "Demand Priority Access Method, Physical Layer and Repeater Specification for 100 Mb/s Operation," also known as the VG ANYLAN network, uses a centralized hub to arbitrate among the requests from network stations. The hub grants access to the stations in a round robin fashion. However, the VG ANYLAN network still requires control by a central hub.

Other proposals suggest the use of a central management entity to assign a slot number to each station on the network, where a station transmits only when a current slot number is equal to the station slot number. Such proposals also require a centralized management entity to manage the network, resulting in additional hardware costs and management overhead requiring network bandwidth.

A rotating priority arrangement for networks using CSMA/CD protocol is disclosed in commonly-assigned, copending application Ser. No. 08/662,333, filed Jun. 12, 1996, entitled ROTATING PRIORITY ARRANGEMENT IN AN ETHERNET NETWORK, the disclosure of which is incorporated in its entirety by reference. The rotating priority arrangement modifies delay times by adding an integer multiple of a delay interval to the minimum interpacket gap (IPG) interval, and decrementing the integer in each network station in response to detected activity on the media. Each station has a unique integer value from the range of zero to the number of stations (N) minus one. The unique integer value ensures that each station has a different delay interval in accessing the media after sensing deassertion of the receive carrier. The station having a zero integer value will have its integer counter reset to (N−1) after a station transmits a data packet on the network, and the stations having nonzero integer values decrement their respective integer counters. Each station determines the number of stations (N) during auto-negotiation with a repeater, where the repeater automatically configures each station for operating according to the network configuration parameters.

DISCLOSURE OF THE INVENTION

There is a need for a method of accessing media of a half-duplex shared network that enables a rotating priority arrangement to be implemented without the necessity of auto-negotiation by a repeater.

There is also a need for an arrangement for accessing the media of a half-duplex shared network that provides bounded packet access latencies.

There is also a need for a method of accessing media of a shared network, where only one station will attempt access of the media during a given interval, without the necessity of a centralized hub or repeater.

There is also a need for an arrangement in a network station for determining a number of active nodes on a half-duplex network.

There is also a need for an arrangement enabling network stations to establish a transmission sequence, where network stations mutually establish and maintain a rotating priority arrangement, without the use of centralized management or auto-negotiation.

These and other needs are attained by the present invention, where each network station determines the number of active stations on the network based on successful packet receptions beginning within a predetermined slot time after a collision.

According to one aspect of the present invention, a method in a network station connected to a shared network media comprises the steps of detecting collisions on the shared network media, detecting successful packet receptions on the shared network media, and determining a first number of stations active on the shared network media by counting a second number of the successful packet receptions beginning within a predetermined slot time following the respective detected collisions, wherein the network stations avoid collisions after the first and second numbers attain a prescribed relationship. The network station determines the number of active stations without the necessity of a repeater having auto-negotiation functions. Hence, a network station can cooperate with the network stations active on the shared network media to avoid collisions when the counted second number, related to successful packet receptions after a detected collision, corresponds to the number of active network stations.

Another aspect of the present invention provides a method, in a network having network stations connected to a media, comprising the steps of resetting first and second counters in each of the network stations in response to reception of an initializing frame, incrementing the first counters in each of the network stations upon the detection of a successful packet reception beginning within a predetermined slot time after a collision on the media setting, in a network station having successfully transmitted a data packet on the media, the corresponding second counter to equal the value of the first counter, decrementing, in the network stations detecting the successfully transmitted data packet, the respective second counters, and in each of the network stations, waiting a corresponding delay time after the successfully transmitted data packet before transmitting a data packet on the media, the corresponding delay time including a predetermined interpacket gap interval and an integer multiple of predetermined delay intervals specified by the corresponding second counter, the predetermined delay interval related to the predetermined slot time. Each of the network stations independently establish a rotating priority arrangement by monitoring collisions and successful packet receptions on the media. Hence, an unlimited number of network stations can access the media according to a distributed protocol that minimizes collisions without the necessity of centralized management or auto-negotiation.

According to another aspect of the present invention, a network interface for connection with a network media includes a carrier sensor configured to identify a successful packet reception on the media, a collision detector capable of detecting a collision on the media, a controller for determining a number of stations active on the media based on a number of the successful packet receptions beginning within a predetermined slot time after respective detected collisions, the controller setting a delay integer based on the successful packet receptions and within a range including zero and the determined number of stations, a programmable timer counting, based on the successful packet reception on the media, a first interval including a multiple of the delay integer and a predetermined delay interval, the predetermined delay interval being related to the predetermined slot time, and a transmitter outputting a data packet onto the media after an absence of activity determined by said sensor during a deferral interval including said first interval and a predetermined interpacket gap interval.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 1, 1A and 1B are block diagrams of a network interface according to an embodiment of the present invention.

FIG. 4 is a diagram illustrating a layout of an Ethernet network.

FIG. 5 is a diagram illustrating the operation of delay timers and deferral timers in respective stations of the network.

BEST MODE FOR CARRYING OUT THE INVENTION

Figure 1B:
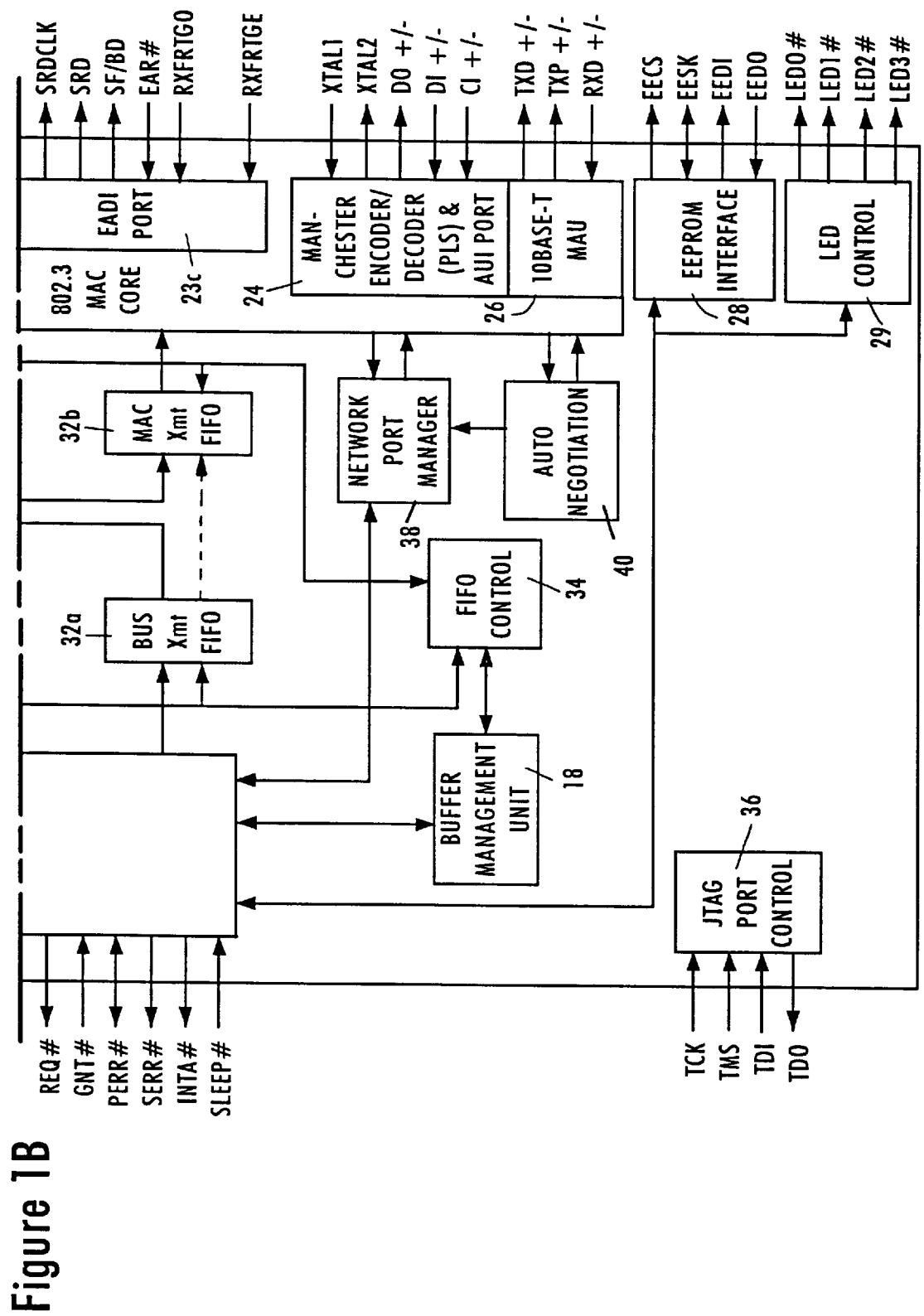

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the Am79C971 PCnet™-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif., the disclosure of which is incorporated in its entirety by reference.

The interface 10 includes a PCI bus interface unit 16, a direct memory access (DMA) buffer management unit 18, and a network interface portion 20. The network interface portion 20 selectively operates in either half-duplex mode or full-duplex mode according to IEEE 802.3x[2]. The network interface portion 20 includes a media access control (MAC) core 22, a General Purpose Serial Interface (GPSI) 23a, a Media Independent Interface (MII) 23b for connecting external 10 MBit/s or 100 MBit/s transceivers, an External Address Detection Interface (EADI) 23c, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes an EEPROM interface 28, an LED control 29, and an expansion bus interface 31 for boot RAM (e.g., EPROM or Flash memory) during startup, and an IEEE 1149.1-compliant JTAG Boundary Scan test access port interface 36. Full-duplex operation can be performed by any of the AUI, GPSI, 10BASE-T and MII interfaces. Additional details of these interfaces are disclosed in the above-referenced Am79C971 Preliminary Data Sheet.

The network station 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The network interface 10 includes a network port manager 38, and an auto-negotiation unit 40 for use in communicating via the media 50 with a corresponding auto-negotiation unit in a hub serving the network interface 10, described below. As described below, the disclosed embodiment eliminates the necessity of determining a number of stations from auto-negotiation. Hence, the disclosed rotating priority arrangement may be implemented without obtaining the number of stations active on the media from a repeater or a hub.

FIG. 4 is a diagram illustrating a network 40 having a repeater 42 connecting four network stations 44 by the shared network media 50. The media 50 may be either coaxial, fiber optic, or twisted pair wire, and hence may couple the interface 10 of each network station 44 to 10BASE-T, 10BASE-2, 100BASE-TX, 100BASE-T4, or 100BASE-FX networks. The network 40 may operate at 10 megabits per second (10 Mbit/s), 100 megabits per second (100 Mbit/s), or 1000 megabits per second (1000 Mbit/s).

The disclosed embodiments use the rotating priority scheme disclosed in the above-referenced application Ser. No. 08/662,333 (attorney docket 1033-158) to improve performance efficiency by stations in Ethernet networks. The delay times in Ethernet network devices are modified by adding integer multiples of predetermined delay intervals to the predetermined interpacket gap interval (IPG) and waiting the modified delay time before attempting access of the media. Hence, only one station having a minimal delay time equal to the predetermined interpacket interval will have access to the media at a given time, resulting in an arrangement that avoids collisions and entirely eliminates the capture effect. The rotating priority scheme also provides bounded access latencies, enabling applications requiring bounded access latencies to be used in half-duplex shared networks. Examples of applications requiring bounded access latencies include multimedia applications transporting video and audio data in real time or near-real time.

The disclosed embodiments provide the particular advantage that each network station independently determines the number of stations active on the shared network media by counting the number of successful packet receptions of data packets transmitted within a predetermined slot time after a detected collision. Each station also has a corresponding deferral counter that identifies the corresponding integer multiple of predetermined delay intervals to be added to the predetermined interpacket gap interval (IPG) to determine the corresponding delay time. Each station then waits the corresponding delay time before attempting access of the media.

In addition, each station establishes its relative location in the rotating priority arrangement by decrementing its corresponding deferral counter upon detecting a successful transmission by another station without encountering a collision. The station resets the corresponding deferral counter to a maximum value after a successful transmission.

Hence, the network encounters an initial state during which the stations of the network independently establish a rotating priority arrangement based on the detected collisions and the successful packet receptions following the detected collisions. Once the network stations have established the rotating priority arrangement, the network encounters no further collisions from the network stations. The disclosed arrangement enables the rotating priority arrangement to be implemented without management intervention, i.e., without the use of a repeater.

Figure 2A:
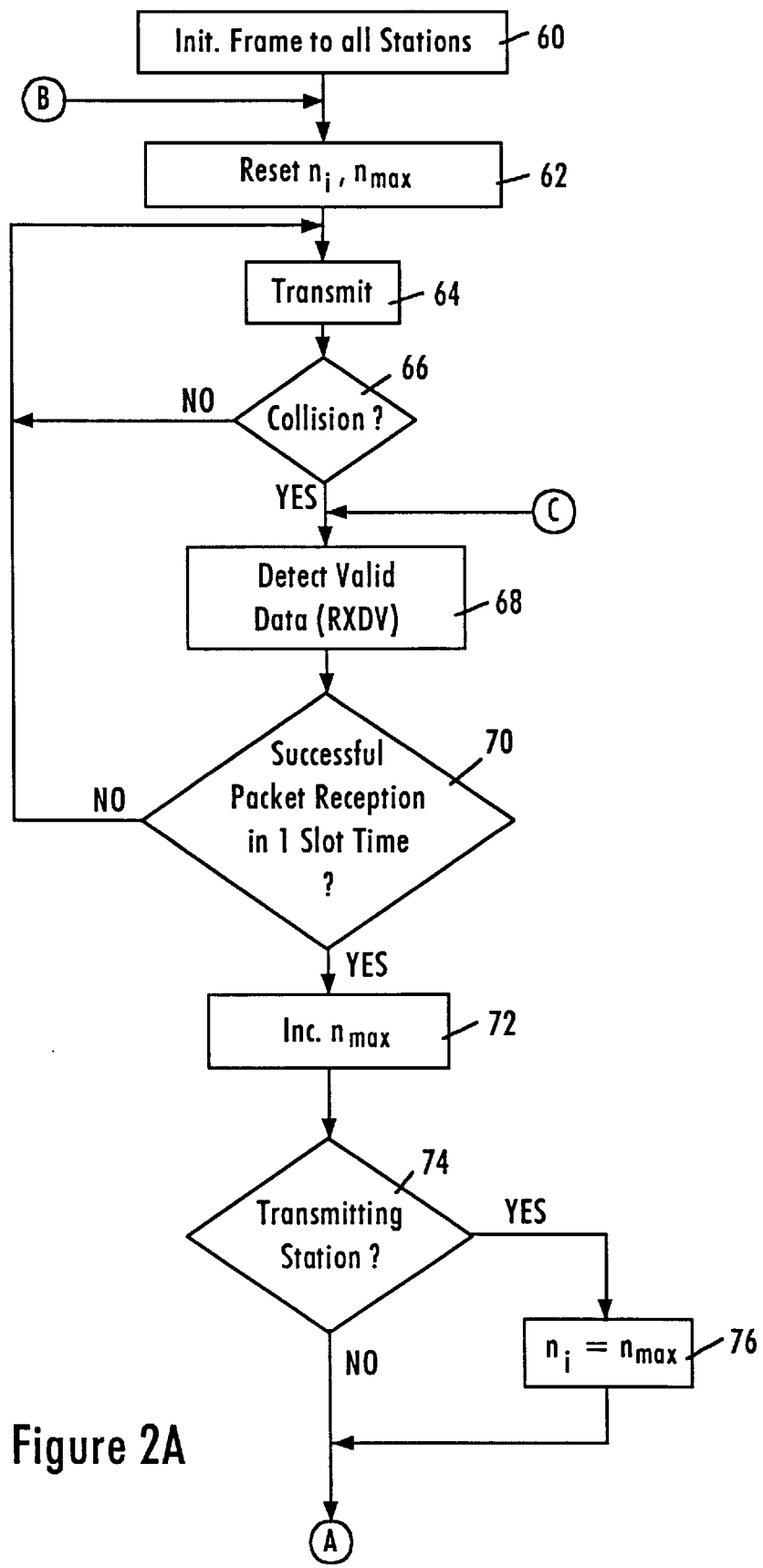
FIGS. 2A and 2B are flow diagrams summarizing the method for accessing media of the Ethernet network according to a first embodiment of the present invention.
Figure 2B:
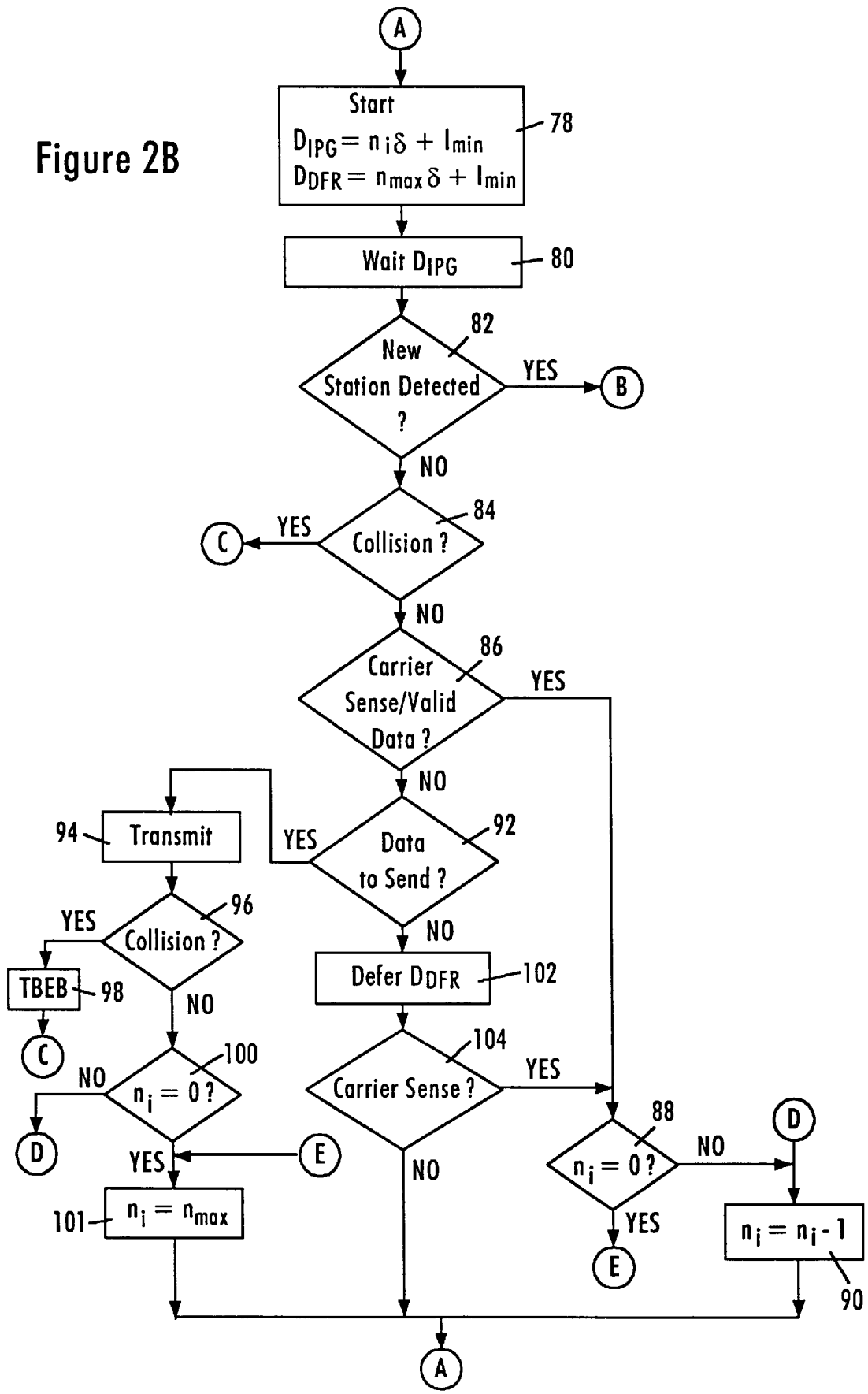

FIGS. 2A and 2B are flow diagrams illustrating the method in a network station of determining the number of network stations and accessing the media 50 of an Ethernet network according to an embodiment of the present invention. Any of the disclosed embodiments can be implemented by embedding executable code within a memory element in the MAC 22 (e.g., register, EPROM, EEPROM, flash memory).

The method of FIG. 2A begins in step 60, where the MAC 22 of the network station outputs an initializing frame to all network stations. The initializing frame is an Ethernet frame including the address of the transmitting station, enabling the network stations to identify the new station. Each network station, including the transmitting station, resets its corresponding internal station counter ($n_{max}$) and deferral counter ($n_i$) in step 62 to zero values in response to the transmission of the initializing frame. If necessary, the repeater 42 responds to the initializing frame by executing a link startup procedure, and configures the station 44 for operating according to the network configuration parameters. Additional details regarding repeaters and auto-negotiation are disclosed in Breyer et al. "Switched and Fast Ethernet: How It Works and How to Use It", Ziff-Davis Press, Emeryville, Calif. (1995), pp. 60–70, and Johnson, "Fast Ethernet: Dawn of a New Network", Prentice-Hall, Inc. (1996), pp. 158–175, the disclosures of which are incorporated in their entirety by reference.

After resetting its internal station and deferral counters in step 62, the MAC 22 begins operations according to conventional Ethernet IEEE 802.3 protocol. If the network interface 10 has data to transmit on the media 50, the MAC 22 transmits the data packet in step 64 after waiting the minimum interpacket gap ($I_{min}$) after deassertion of a receive carrier on the media 50. The predetermined interpacket gap interval ($I_{min}$) is defined as 96 bit times for 10 megabit per second, 100 megabit per second, and 1000 megabit per second networks. After the MAC 22 begins transmission in step 64, the MAC 22 detects whether a collision is encountered in step 66. For example, activity on both twisted pair signals (RXD+/− and TXD+/−) at the same time constitutes a collision, causing the internal COL signal to be activated. The internal collision signal (COL) FIG. 1 will remain active until one of the two colliding signals changes from active to idle. Hence, each station on the network detects the collision, regardless of whether that station is transmitting a data packet.

If in step 66 the MAC 22 does not detect a collision, the method returns to either transmit another data packet in step 64. If the MAC 22 has no more data to send, it may remain idle and merely detect the presence of a collision in step 66. Hence, if the MAC 22 determines in step 64 that there is no data in the transmit FIFO to be transmitted, the MAC 22 will simply monitor the media 50 to determine the presence of a collision in step 66. Hence, the MAC 22 operates according to conventional Ethernet protocol until the detection of a collision in step 66.

Once a collision is detected in step 66, the MAC 22 determines whether a station on the network wins the collision arbitration by detecting a successful packet transmission reception in step 68, where the receive data valid (RX_DV) signal is asserted valid and deasserted valid. The MAC 22 then checks in step 70 to determine whether successful packet reception begins within a single slot time after the detected collision in step 70. In other words, the MAC 22 detects the beginning of a successful packet reception by assertion of the receive data valid signal. The assertion of the receive data valid signal within a single slot time after a detected collision indicates that one of the colliding stations has won the collision mediation. The MAC 22 determines completion of the successful packet reception upon detecting deassertion of the receive data valid (RX_DV) and a valid Cyclic Redundancy Check (CRC). If successful packet reception does not occur within one slot time of the detected collision, the MAC 22 returns to step 64 to follow the conventional Ethernet protocol.

If the MAC 22 detects a successful packet reception beginning within a single slot time after a detected collision, the MAC 22 increments in step 72 its station counter ($n_{max}$). The transmitting station that successfully transmitted the data packet set its deferral counter equal to the value of the station counter. Hence, the MAC 22 checks in step 72 if it was the transmitting station. If the MAC 22 determines in step 74 that another station was the transmitting station, then the deferral counter ($n_i$) is maintained at the same value. However, if the MAC 22 determines in step 74 that it was the transmitting station, then the deferral counter ($n_i$) is set equal to the value of the station counter in step 76 ($n_i = n_{max}$).

The above-described method of determining the number of stations is executed in each of the network stations connected to the media. Although a network station may not have any data to transmit, each network station monitors the network media to perform steps 62, 66, 68, 70, and 72. Hence, each network station increments its corresponding station counter ($n_{max}$) in step 72 for every successful packet reception beginning within a single slot time after a detected collision. Hence, all the network stations maintain the same station counter value.

The method continues in FIG. 2B, where the MAC 22 of each station starts counting a delay time ($D_{IPG}$) for an IPG timer and a deferral time ($D_{DFR}$) for a deferral time (DFR) in step 78. The delay time and the deferral time are set in programmable IPG and DFR timers, respectively. As recognized in the art, the default value of the IPG timer is a predetermined interpacket gap (IPG) interval, specified by Ethernet (ANSI/IEEE 802.3) protocol as 96 bit times.

As shown in step 78, the IPG delay interval ($D_{IPG}$) is determined by adding to the minimum predetermined interpacket gap interval ($I_{MIN}$=96 bit times) an integer multiple ($n_i$) of a predetermined delay interval ($\delta$), the integer specified by the deferral counter ($n_i$). The deferral timer value ($D_{DFR}$) is determined by adding to the minimum predetermined interpacket gap interval ($I_{MIN}$) a maximum integer multiple ($n_{max}$) of the predetermined delay interval ($\delta$), the maximum integer stored by the station counter ($n_{max}$). As described below, the disclosed method enables the stations to avoid collisions when the station counter equals the number of active stations (N) minus 1 (i.e., $n_{max}=N-1$).

The predetermined delay interval of the present invention is implemented in FIG. 2B as equal to $\delta$. The value $2\delta$ is defined as the maximum round trip delay between two stations, also defined as a slot time ($t_s$). Since a slot time ($t_s$) is defined as 512 bit times for 10 MB/s and 100 MB/s networks, the value $2\delta$ also equals 512 bit times for a 10 MB/s and 100 MB/s networks. Hence, the delay $2\delta$ has a duration of 51.2 microseconds and 5.12 microseconds in 10 megabit per second and 100 megabit per second networks, respectively. The value $2\delta$ has a preferred value of 4096 bit times for 1000 megabit per second networks, although other values may be used consistent with the network topology and propagation characteristics.

Hence, the MAC 22 in step 78 sets the programmable IPG timer to a value $D_{IPG}=n_i\delta+I_{MIN}$, and the deferral timer DFR to a maximum delay time $D_{DFR}=n_{max}\delta+I_{MIN}$, and starts the IPG timer and the deferral (DFR) timer after each detected successful packet reception, i.e., upon deassertion of the receive carrier. As described below, the IPG timers and deferral timers are also simultaneously restarted if the deferral timer lapses without any detected activity on the media 50.

After starting the IPG and deferral timers in step 78, the MAC 22 waits in step 80 the delay time ($D_{IPG}$). While waiting the delay time ($D_{IPG}$), the MAC 22 determines the existence of activity on the media 50 in steps 82, 84 and 86. Specifically, if in step 82 the MAC 22 receives an initialization frame from a new station, the MAC 22 returns to step 62 to reset the station counter ($n_{max}$) and the deferral counter ($n_i$). If the MAC 22 detects in step 84 a collision on the media 50, for example by sensing the Collision Detect (CD) signal asserted valid, the MAC 22 returns to step 68. As described above, a detected collision indicates that a network station is not identified by the station counter ($n_{max}$). Hence, the station counter ($n_{max}$) needs to be incremented until the station counter value corresponds to the number of active stations (N) on the media 50 (i.e., $n_{max}=N-1$), at which point the rotating priority arrangement enables the stations to avoid collisions.

If in step 84 there are no collisions detected, the MAC 22 checks in step 86 whether a successful packet reception has occurred on the shared network media 50. For example, the MAC 22 detects successful packet reception by checking the MII interface 236 for assertion of the Receive Data Valid (RX-DV) followed by the deassertion of the RX-DV and a correct Cyclic Redundancy Check (CRC). If in step 86 the MAC 22 detects successful packet reception, the MAC 22 determines that the packet was not transmitted in response to a collision encountered by the transmitting station, and in response decrements the deferral counter ($n_i$) in step 90 after verifying in step 88 the deferral counter does not equal zero. Hence, if the MAC 22 defers to other stations on the media and no collisions are encountered by the transmitting station, the MAC 22 decrements the deferral counter in step 90 to shift its relative position in the rotating priority arrangement.

If in step 86 the MAC 22 does not detect any activity on the media while waiting the delay time ($D_{IPG}$), the MAC 22 checks in step 92 whether the transmit FIFO 32b has a data packet to send. If the transmit FIFO 32b has data to send, the MAC 22 begins to transmit the data packet in step 94, and checks in step 96 if a collision is encountered. If the MAC 22 encounters a collision, the MAC 22 performs collision mediation in step 98 according to the conventional TBEB algorithm, described above, and returns to step 68 to increment the station counter ($n_{max}$) accordingly. If no collision is encountered in step 96, the MAC 22 completes transmission, checks whether the deferral counter equals zero in step 100, and resets the deferral counter ($n_i$) in step 101 to equal the maximum integer value ($n_{max}$) if the deferral counter equals zero.

If in step 92 the MAC 22 determines that the transmit FIFO 32 has no data to send, then the MAC 22 enters a deferral state in step 102 to wait the remaining interval ($D_{DFR}-D_{IPG}$) counted by the deferral timer. The MAC 22 checks in step 80 whether a carrier is detected on the media 50 during the remainder of the deferral interval ($D_{DFR}$). If activity is detected on the media while waiting the maximum delay time ($D_{DFR}$) in step 104, indicating a successful packet reception, the MAC 22 checks if the integer value of the deferral counter ($n_i$) equals zero in step 88. If the integer value equals zero, then the deferral counter is reset in step 101. Otherwise, the nonzero integer value is decremented in step 90. The IPG and deferral counters are then reset in step 78 and restarted in step 80.

Hence, the method of modulating the delay time based on the number of stations on the network establishes a rotating priority arrangement, where the sequence of stations having priority access to the media is rotated by successively decrementing the delay time that a station must wait after sensing deassertion of the receive carrier on the media before attempting transmission.

The method of the disclosed embodiment also enables each network station to independently determine the number of stations on the network, and to establish with the other network stations a rotating priority arrangement without the use of centralized management or auto-negotiation. Each station determines the number of active stations based on the collision signals detected on the network media and successful packet transmissions beginning within a predetermined slot time after a collision.

Use of the rotating priority arrangement also ensures that the station having a zero counter value ($n_i=0$) defers for the longest time ($n_i=n_{max}$) prior to attempting to transmit another data packet. During the initial establishment of the rotating priority arrangement, the station having just transmitted defers for the longest time prior to attempting to transmit another packet. Although network stations may initially encounter collisions, requiring collision mediation, the transmitting stations will begin to space their respective IPG timers such that collisions are avoided when the station counters ($n_{max}$) correspond to the number of station (i.e., $n_{max}$=N−1), as illustrated in Table 1:

TABLE 1

| Station | A | | B | | C | | D | |
|---|---|---|---|---|---|---|---|---|
| No. of Transmits (Tr) | $n_i$ | $n_{max}$ | $n_i$ | $n_{max}$ | $n_i$ | $n_{max}$ | $n_i$ | $n_{max}$ |
| 0 | 0 | 0 | 0 | 0 | 0 | 0 | 0 | 0 |
| 1 | 1 | 1 | 0 | 1 | 0 | 1 | 0 | 1 |
| 2 | 1 | 2 | 2 | 2 | 0 | 2 | 0 | 2 |
| 3 | 1 | 3 | 2 | 3 | 3 | 3 | 0 | 3 |
| 4 | 0 | 3 | 1 | 3 | 2 | 3 | 3 | 3 |
| 5 | 3 | 3 | 0 | 3 | 1 | 3 | 2 | 3 |
| 6 | 2 | 3 | 3 | 3 | 0 | 3 | 1 | 3 |

Table 1 illustrates operation of the method of FIGS. 2A and 2B using the network of FIG. 4. All network stations begin at (Tr=0) by resetting their respective station counters and deferral counters to zero, resulting in an IPG for each station equal to exactly 96 bit times. When two or more stations simultaneously transmit a data packet, a collision will occur, followed by collision mediation and a successfully transmitted data packet. Assuming station A wins the collision mediation, all four stations increment their respective station counters ($n_{max}$) to 1 after station A successfully transmits its data packet (Tr=1), and station A sets its deferral counter ($n_i$) equal to the station counter value ($n_i=1$). As shown after one transmission (Tr=1), station A has a deferral counter ($n_i$) value of 1, and stations B, C and D have a deferral counter value ($n_i$) of zero.

Assuming station B then transmits successfully a data packet after collision with either stations C or D, each of the stations increment the station counter ($n_{max}$=2), and station B sets its deferral counter ($n_i$) equal to the station counter value ($n_i$=2). Hence, stations C and D continue to have IPG timers set to 96 bit times after the second transmission (Tr=2) since the respective deferral counters ($n_i$) equal zero. Assume next that stations C and D transmit data packets and encounter a collision. If station C wins the collision mediation, each of the stations increment the station timer ($n_{max}$=3) and station C sets the deferral counter equal to the station counter ($n_i$=3), where after the third transmitted data packet (Tr=3), stations D, A, B and C have deferral counter values, $n_i$=0, 1, 2, 3, respectively. Hence, the network stations mutually establish a rotating priority arrangement after the third packet transmission (Tr=3), and subsequently avoid collision by adjusting their respective IPG timers based upon the deferral timer value ($n_i$). Hence, the stations avoid collisions after the station timer ($n_{max}$) corresponds to the number of stations on the networks (N=4), i.e., when $n_{max}$=N−1.

FIG. 5 is a diagram illustrating in further detail the rotating priority sequence of FIG. 2B. Specifically, FIG. 5 illustrates the counting of the respective IPG ($D_{IPG}$) and deferral ($D_{DFR}$) timers in the network stations A, B, C, and D of FIG. 3. The deferral timers in each of the stations A, B, C, and D, count a maximum delay time ($D_{DFR}$). The integer deferral values stored in the stations A, B, C, and D, are $n_i$=0, 1, 2, and 3, respectively. As shown in FIG. 5, all IPG and deferral timers start simultaneously at the deassertion of a receive carrier on the media 50 at event 110. Since station A has an integer value of $n_i$=0, the IPG delay interval ($D_{IPG}$) for station A equals $I_{MIN}$. Hence, the IPG counter for station A lapses at event 112, 96 bit times after deassertion of the receive carrier. If station A had data to transmit, station A would begin transmission at event 112. The IPG timers of stations B, C, and D, however, are still counting. Hence, if station A were to begin transmission, stations B, C, and D would wait for transmission to be completed, decrement their deferral counters in response to a valid receive data from the physical layer (see step 90), and restart the timers in step 78 in response to deassertion of the carrier sense.

As shown in FIG. 5, station B has an IPG delay interval $(D_{IPG})=1\delta+I_{MIN}$. Hence, the IPG timer of station B lapses at event 114. Assuming station A had no data to transmit, station B would begin transmission at event 114 in response to lapse of the corresponding IPG timer and detecting an absence of activity on the media during the corresponding IPG interval. Similarly, the IPG timer of station C would lapse at event 116, and station C would begin transmission if stations A and B did not have any data to send, i.e., if there was an absence of activity on the media during the waiting by station C. Finally, the IPG timer of station D would lapse at event 118, and would attempt transmission if stations A, B and C did not have any data to send, causing an absence of activity on the media during the waiting by station D.

As shown in FIG. 5, each of these stations A, B, C and D have corresponding delay times between a range of the minimum interpacket gap interval ($I_{MIN}$) equal to 96 bit times and the maximum delay of ($n_{max}=N-1$) delay intervals plus the predetermined IPG interval. The deferral counter DFR lapses at the same time as the maximum delay interval counted by station D. Hence, if none of the stations A, B, C, and D have any data to send, the IPG and deferral timers are reset and the sequence is repeated without decrementing any of the deferral counters ($n_i$). Hence, if stations A, B, C, and D have no data to send between events 110 and 118, then the IPG timers for stations A, B, C, and D are reset at event 118 and lapse at events 120, 122, 124, and 126, respectively.

FIG. 5 also illustrates the use of the deferral timer (DFR), where if stations A, B, and C have no data to send, the stations must wait the maximum delay time before attempting transmission. Hence, if station A has no data to transmit at event 112, station A must wait until event 120 before transmitting any data packets subsequently received by the corresponding transmit FIFO 32.

Hence, the arrangement of the present invention ensures that once the network has encountered a number of collisions corresponding to the number of active stations on the media ($n_{max}=N-1$), only one station will have access to the media at any given time. Moreover, the present invention eliminates the capture effect entirely, and provides a collision avoidance mechanism. Further, the present invention provides a bounded access latency interval equal to (N) times the maximum packet transmission time. Since a given station will have a bounded access latency between transmission of two packets, the present invention enables the use of time-sensitive applications such as multimedia in half-duplex shared networks.

Figure 3A:
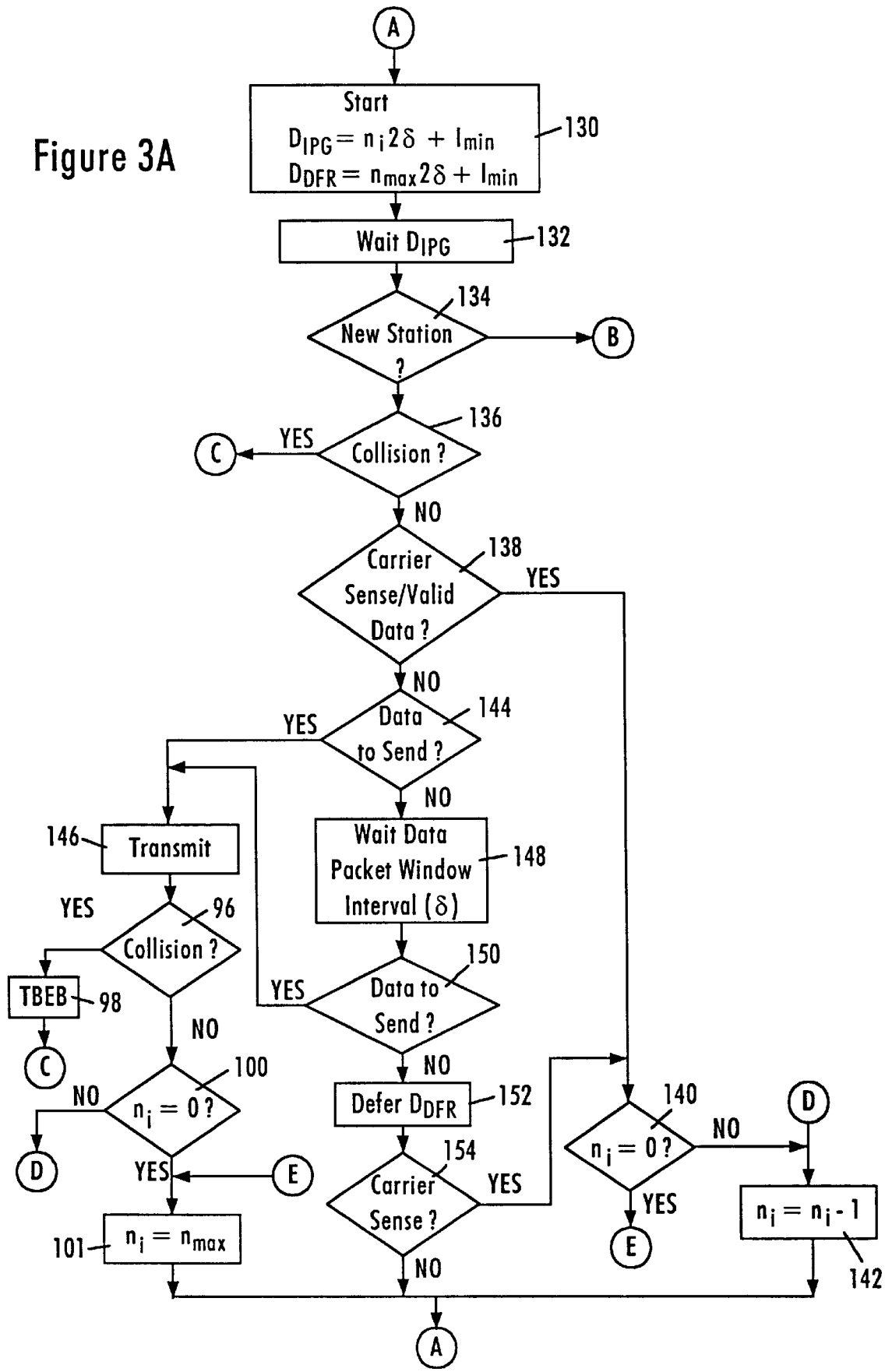
FIGS. 3A and 3B are flow diagrams illustrating variations of the method of FIG. 2B for accessing media of the Ethernet network according to second and third embodiments of the present invention.

FIG. 3A is a variation of the embodiment of FIG. 2B, where a transmission window interval is added at the end of the waiting step if the MAC 22 determines the transmit FIFO 32b does not have data to send. Specifically, if a station 10 does not have a data packet to send upon the lapse of the IPG timer, the embodiment of FIG. 2B requires the station to wait for an entire cycle ($D_{DFR}$) before attempting transmission of a subsequently-received data packet. The embodiment of FIG. 3A, however, provides a transmission window interval that begins at the waiting interval defined by the IPG timer. If the MAC 22 detect the presence of a data packet for transmission during the transmission window interval, the data packet is transmitted by the MAC 22.

The embodiment of FIG. 3A follows after the steps of FIG. 2A, and includes the initial steps of setting the IPG timer ($D_{IPG}$) and deferral timer ($D_{DFR}$) in step 130. Upon sensing deassertion of the receive carrier, the MAC 22 starts the IPG timer and the deferral timer in step 130. Since the embodiment of FIG. 3A includes a transmission window interval corresponding to one-half the slot time (i.e., equal to $\delta$), the predetermined delay interval multiplied by the integer ($n_i$) in the IPG timer and ($n_{max}$) in the deferral timer (DFR) is set to $2\delta$. Hence, the term predetermined delay interval of the present invention is defined as a delay interval related to the predetermined slot time ($t_s$) and being multiplied by a maximum integer ($n_{max}$) to define a maximum delay time ($D_{DFR}$), and variable integers ($n_i$) to define different delay times in respective stations.

After the MAC 22 starts the IPG timer and the deferral timer in step 130, the MAC 22 waits in step 132 for the IPG interval ($D_{IPG}$) defined in step 130. While waiting the specified IPG interval, the MAC 22 checks for a new station in step 34, a collision in step 136, and carrier sense in step 138, as described above with respect to FIG. 2B. If a successful packet reception is detected in step 138, the MAC 22 decrements the deferral counter in step 142 upon deassertion of the receive carrier after verifying in step 140 the deferral counter does not equal zero. If in step 138 there is no carrier sense detected and the IPG timer has lapsed, the MAC 22 checks in step 144 if the transmit FIFO 32b has data to send. If the transmit FIFO 32b has data to send, the data packet is transmitted on the media in step 146. However, if the transmit FIFO does not have data to send at the end of the IPG delay interval ($D_{IPG}$), the MAC 22 waits for a data packet during a transmission window interval equal to $\delta$ in step 148. During the transmission window interval ($\delta$), the MAC 22 checks if the transmit FIFO 32b has data to send in step 150. If the transmit FIFO 32b now has data to send, the data packet is transmitted in step 146. Hence, the embodiment of FIG. 3A provides a transmission window interval providing a station extra time to determine whether the corresponding transmit FIFO has data to send.

If in step 150 the MAC 22 determines that there is no data to send, then the station defers in step 152 for the remainder of the deferral period $D_{DFR}$ defined in step 130. The MAC 22 checks during the deferral interval ($D_{DFR}$) whether a receive carrier is sensed on the media in step 154 indicating successful packet reception. If a receive carrier is sensed, the MAC 22 checks whether the deferral counter value ($n_i$) is equal to zero in step 140. If the deferral counter value ($n_i$) is not zero, the deferral counter is decremented in step 142, otherwise the counter is reset to the maximum value.

The embodiments of FIGS. 2B and 3A use a programmable IPG timer to count the delay time ($D_{IPG}$) including the predetermined interpacket gap interval ($I_{MIN}$) and an integer multiple ($n_i$) of a predetermined delay interval related to a predetermined slot time ($t_s$). As described above, the predetermined delay interval equals $\delta$ and $2\delta$ in FIGS. 2B and 3A, respectively.

Figure 3B:
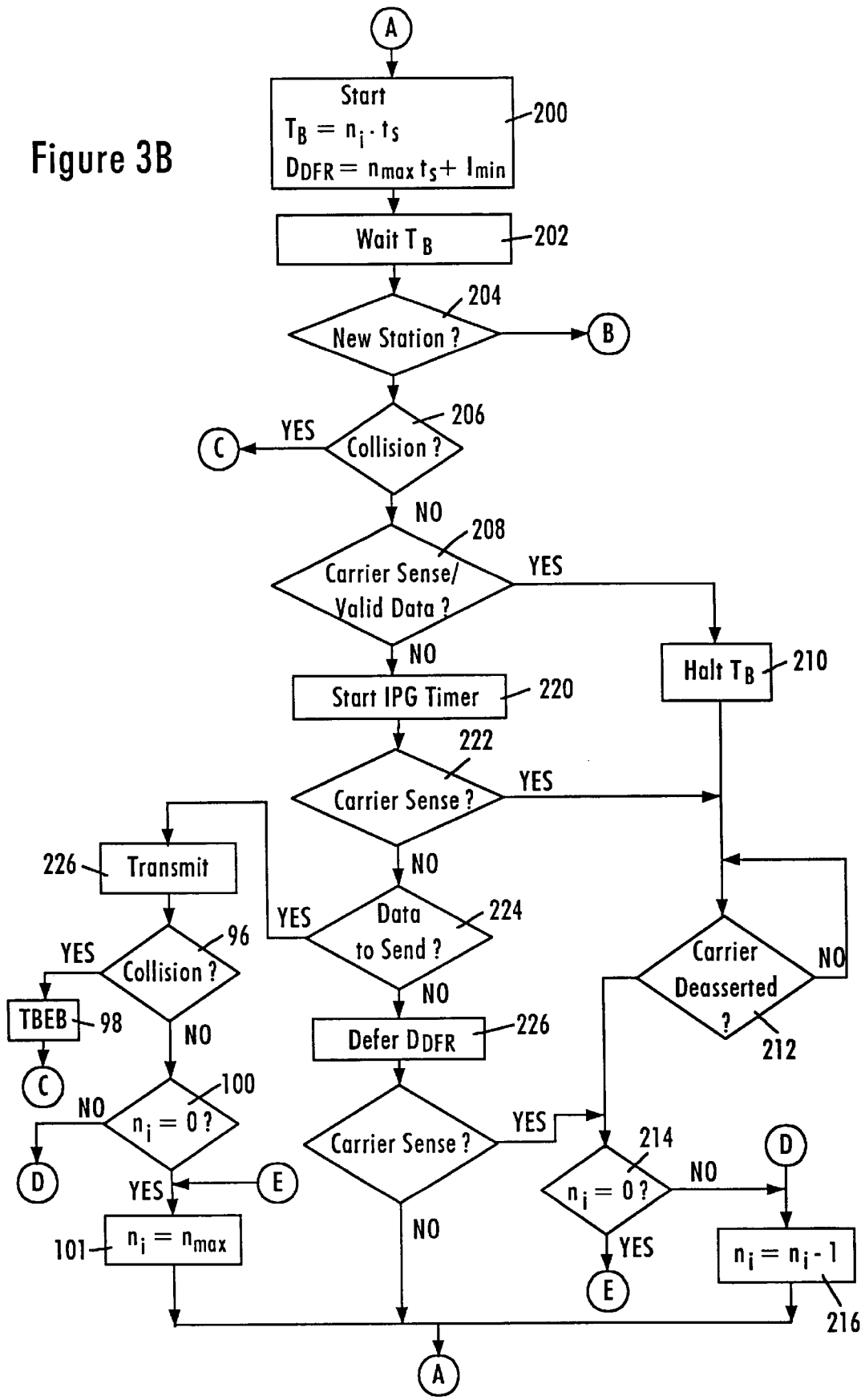

FIG. 3B is a flow diagram illustrating another embodiment that uses a backoff collision counter in conjunction with a nonprogrammable IPG timer to calculate the delay time of a station. Hence, the delay time illustrated in FIG. 5 for a network station is implemented using an IPG counter having a fixed count value of 96 slot times in conjunction with a collision counter that is normally used to calculate backoff intervals during collision mediation.

The MAC 22, upon deassertion of a receive carrier, starts in step 200 a collision backoff timer ($T_B$) that counts an integer multiple ($n_i$) of a predetermined delay equal to the slot time ($t_s$). The deferral timer ($D_{DFR}$) is set to the maximum delay interval consisting of the predetermined IPG ($I_{MIN}$) and a maximum integer multiple ($n_{max}$) of the predetermined delay interval ($t_s$). As described above, the stations will avoid collisions after the station counter ($n_{max}$) corresponds to the number of stations (N), i.e., $n_{max}=N-1$.

After the MAC 22 starts the backoff timer ($T_B$) and deferral timer ($D_{DFR}$) in step 200 in response to sensed deassertion of the receive carrier, the MAC 22 waits the backoff interval in step 202. During the waiting in step 202, the MAC 22 checks for a new station and a collision in steps 204 and 206, respectively, and then checks in step 208 whether a receive carrier is sensed on the media indicating beginning of successful reception of a data packet by a network station. If the MAC 22 senses the receive carrier, the collision backoff timer ($T_B$) is halted in step 210. The MAC 22 then monitors the media using the CSMA/CD sensor in step 212 to detect deassertion of the carrier. When the CSMA/CD senses deassertion of the receive carrier in step 212, indicating successful reception is complete, the deferral counter is decremented in step 216 after confirming the deferral counter does not equal zero in step 214, and the backoff and deferral timers are restarted in step 200.

Hence, the programmable collision backoff timer ($T_B$) can be used instead of a programmable IPG timer in order to count the integer multiple of the predetermined delay interval. If in step 208 the MAC 22 determines an absence of carrier activity during the waiting in step 202, the MAC 22 starts the IPG timer in step 220 after the lapse of the collision backoff timer ($T_B$). The IPG timer counts the predetermined minimum IPG interval ($I_{MIN}$) of 96 bit times. The MAC 22 checks during the IPG interval in step 222 whether a receive carrier is sensed on the media indicating beginning of reception. If a receive carrier is sensed, the MAC 22 waits until deassertion of the receive carrier in step 212 indicating the successful reception of the data packet and decrements the deferral counter in step 216. However, if in step 222 there is no carrier sensed, the MAC 22 checks in step 224 if the transmit FIFO 32b has a data packet to send. If the transmit FIFO 32b has data to send, the data packet is transmitted in step 226 after the IPG timer has lapsed. Hence, the delay time (D) of a station is implemented using the collision backoff timer ($T_B$) and the IPG timer counting the predetermined minimum IPG interval ($I_{MIN}$) to obtain the overall delay time $D=T_B+I_{MIN}$.

Assuming no collisions are detected in step 96 of FIG. 3B, upon completion of transmission of the data packet in step 226, the MAC 22 resets the deferral counter ($n_i$) to the value of the station counter in step 100, described above.

If in step 224 the MAC 22 determines there is no data to send, the MAC 22 defers for the remainder of the maximum delay interval ($D_{DFR}$), and checks in step 226 if a receive carrier is sensed during the deferral interval. If a receive carrier is sensed during the deferral interval in step 226, the deferral counter is decremented in steps 214 and 216 accordingly. Otherwise, if no carrier is sensed, the timers are reset in step 200.

Figure 6:
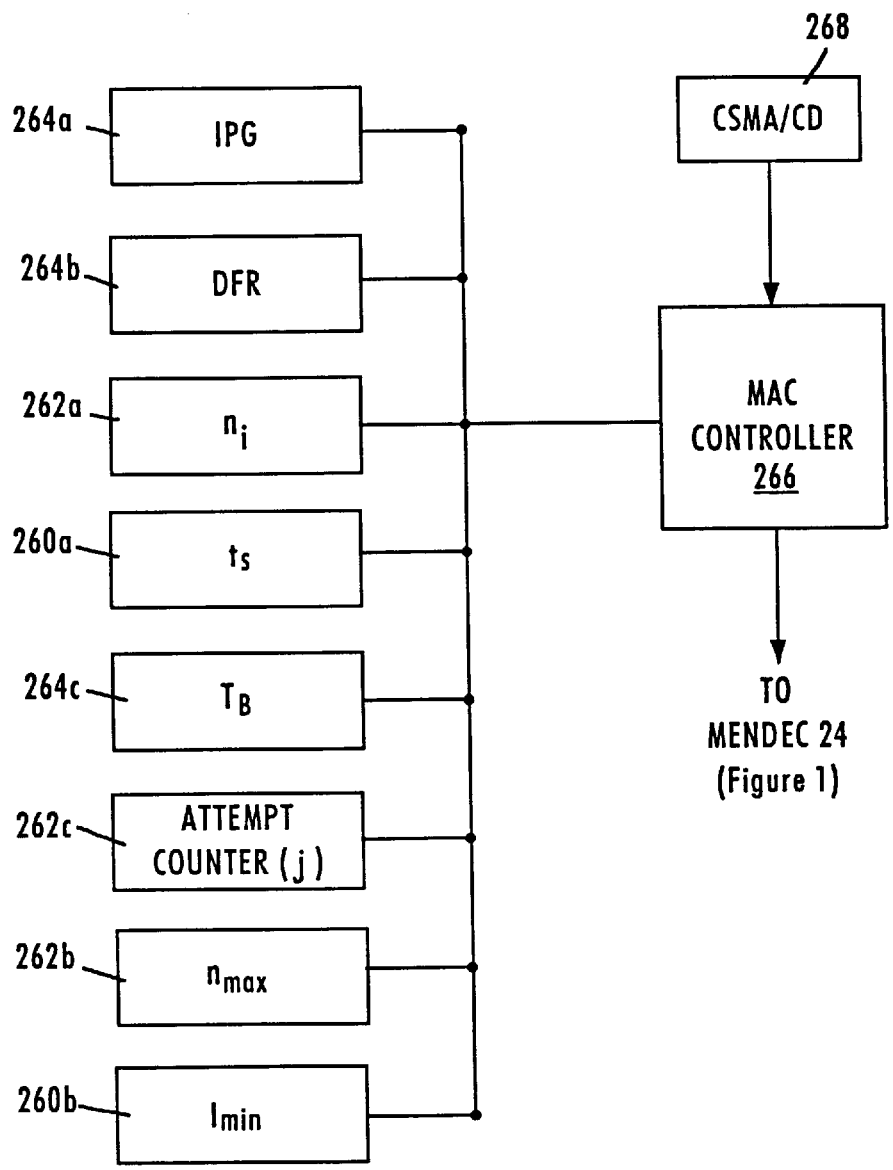
FIG. 6 is a block diagram of the media access control (MAC) of FIG. 1.

FIG. 6 is a block diagram illustrating the functional components of the MAC 22. The media access control 22 includes a plurality of registers 260, counters 262, and timers 264. The MAC 22 also includes a controller 266 and a carrier sense multiple access/collision detection (CSMA/CD) portion 268. The registers 260a and 260b are stored with the predetermined time slot ($t_s$) and minimum interpacket gap interval ($I_{MIN}$), respectively, specified by Ethernet 802.3. The integer ($n_i$) is counted in a deferral counter 262a, and the determined number of stations ($n_{max}$) is counted by station counter 262b in response to a detected collision followed by a successful packet reception beginning within a single slot time. The number of collisions (j) encountered during conventional TBEB collision mediation is counted in counter 262c. As described above with respect to FIG. 3B, the integer counter 262a may be deleted and the attempt counter 262b may be used to count the deferral integer ($n_i$).

Timers 264a, 264b and 264c count the minimum IPG ($I_{MIN}$), the deferral interval ($D_{DFR}$), and the backoff interval ($T_B$) of FIG. 3B. According to FIG. 3B, the IPG timer 264a is a non-programmable timer that counts 96 bit times. The IPG timer 264a may also be a programmable timer that is set with the delay time ($D_{IPG}$) according to the embodiments of FIGS. 2A, 2B, and 3A. Use of a programmable IPG timer 264a eliminates the need for collision backoff timer 264c in implementing the rotating priority arrangement of the present invention.

The MAC controller 166 starts the appropriate delay timers 264 based a signal from the CSMA/CD 268 indicating that deassertion of the receive carrier on the media has been sensed. The MAC controller 166 sends an instruction to the Manchester encoder/decoder 24 (MENDEC) to attempt access to the media after the appropriate timers 164 have reached the programmed delay times, described above.

According to the present invention, the addition of integer multiples of a predetermined delay interval is consistent with Ethernet protocol because this protocol specifies only minimum delay times. Hence, the present invention provides a collision avoidance system that automatically establishes a rotating priority arrangement. The collision avoidance system eliminates the capture effect, improves network throughput during heavy traffic conditions, and provide bounded access latencies.

Although the disclosed embodiment are described with respect to Ethernet networks, it will be appreciated that the present invention may also be applicable to other network protocols. In addition, the present invention may be applied to different types of data, for example, TCP/IP and IPX type of traffic.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. In a network station connected to a shared network media, a method comprising:

detecting collisions on the shared network media;

detecting successful packet receptions on the shared network media; and determining a first number of stations active on the shared network media by counting a second number of the successful packet receptions beginning within a predetermined slot time following the respective detected collisions, wherein the network stations avoid collisions after the first and second numbers attain a prescribed relationship.

2. The method of claim 1, wherein the network stations avoid the collisions when the second number equals the first number minus one.

3. The method of claim 1, further comprising:

transmitting a data packet on the shared network medium within the predetermined slot time following one of the detected collisions; and setting a deferral counter equal to the second number in response to a detected successful reception of the data packet.

4. The method of claim 3, further comprising decrementing the deferral counter following the setting step in response to a detected successful packet reception of another data packet transmitted by another network station.

5. The method of claim 4, further comprising waiting, after each detected successful packet reception, a delay time including a predetermined interpacket gap interval and an integer multiple of a predetermined delay interval, the predetermined delay interval related to the predetermined slot time, the integer identified by the deferral counter.

6. The method of claim 5, further comprising transmitting a second data packet at an end of said waiting step in response to a determined absence of activity on the shared network medium during the delay time.

7. The method of claim 5, wherein said predetermined delay interval is substantially equal to one half the predetermined slot time.

8. The method of claim 5, wherein said predetermined delay interval is substantially equal to the predetermined slot time.

9. The method of claim 4, wherein the decrementing step comprises:

determining if the another data packet was transmitted in response to a collision encountered by the another network station during a first transmission of the another data packet; and decrementing the deferral counter if the another data packet was not transmitted in response to said encountered collision.

10. The method of claim 3, further comprising resetting the second number and the deferral counter to zero in response to reception of an initializing frame from the shared network medium.

11. The method of claim 1, further comprising outputting an initializing frame including an address of the network station to the stations on the shared network medium, each of the stations resetting the station count to zero in response to reception of the initializing frame.

12. The method of claim 1, wherein the network is a CSMA/CD network, the predetermined interpacket gap equal to ninety six (96) bit times and the predetermined slot time equal to at least five hundred twelve (512) bit times.

13. The method of claim 1, wherein the network has a data rate of 1000 megabits per second and the predetermined slot time is approximately four thousand ninety six (4096) bit times.

14. A method in a network having network stations connected to a media, the method comprising:

resetting first and second counters in each of the network stations in response to reception of an initializing frame;

incrementing the first counters in each of the network stations upon the detection of a successful packet reception beginning within a predetermined slot time after a collision on the media;

in a network station having successfully transmitted a data packet on the media, setting the corresponding second counter to equal the value of the first counter;

decrementing, in the network stations detecting the successfully transmitted data packet, the respective second counters; and in each of the network stations, waiting a corresponding delay time after the successfully transmitted data packet before transmitting a data packet on the media, the corresponding delay time including a predetermined interpacket gap interval and an integer multiple of predetermined delay intervals specified by the corresponding second counter, the predetermined delay interval related to the predetermined slot time.

15. The method of claim 14, wherein the network stations avoid collisions after each first counter has a value equal to the number of the network stations minus one.

16. The method of claim 14, wherein the decrementing step comprises:

determining if the successfully transmitted data packet was transmitted in response to a collision encountered during a first transmission of the successfully transmitted data packet; and decrementing the deferral counter if the successfully transmitted data packet was not transmitted in response to said encountered collision.

17. The method of claim 14, wherein said predetermined delay interval is substantially equal to one half the predetermined slot time.

18. The method of claim 14, wherein said predetermined delay interval is substantially equal to the predetermined slot time.

19. The method of claim 14, wherein the network is a CSMA/CD network, the predetermined interpacket gap equal to ninety six (96) bit times and the predetermined slot time equal to at least five hundred twelve (512) bit times.

20. A network interface for connection with media of a network, comprising:

a carrier sensor configured to identify a successful packet reception on the media;

a collision detector capable of detecting a collision on the media;

a controller for determining a number of stations active on the media based on a number of the successful packet receptions beginning within a predetermined slot time after respective detected collisions, the controller setting a delay integer based on the successful packet receptions and within a range including zero and the determined number of stations;

a programmable timer counting, based on the successful packet reception on the media, a first interval including a multiple of the delay integer and a predetermined delay interval, the predetermined delay interval being related to the predetermined slot time; and a transmitter outputting a data packet onto the media after an absence of activity determined by said sensor during a deferral interval including said first interval and a predetermined interpacket gap interval.

21. The interface of claim 20, wherein said timer counts said deferral interval including said first interval and said predetermined interpacket gap interval.

22. The interface of claim 20, further comprising a interpacket gap timer counting said predetermined interpacket gap interval in response to a lapse of said programmable timer, the transmitter outputting said data packet in response to a lapse of said interpacket gap timer.

23. The interface of claim 22, wherein said programmable timer counts a collision backoff interval according to an exponential backoff algorithm in response to a detected collision.

24. The interface of claim 22, further comprising a deferral timer counting a maximum delay interval consisting of said predetermined interpacket gap interval and a maximum integer multiple of said predetermined delay interval, the maximum integer value based on the determined number of stations.

25. The interface of claim 22, wherein said maximum value equals said determined number of stations minus one.

26. The interface of claim 20, wherein the controller comprises:

a first counter incremented in response to each said detected successful packet reception beginning within the predetermined slot time after the corresponding detected collision; and a second counter storing said delay integer, the controller setting the second counter equal to the value of the first counter in response to successful transmission of said data packet by said transmitter.

27. The interface of claim 26, wherein the controller decrements the second counter in response to a successful transmission of a data packet by another station without encountering a collision.

28. The interface of claim 26, wherein the controller resets the first and second counters in response to reception of an initializing frame from the media.

\* \* \* \* \*

UNITED STATES PATENT AND TRADEMARK OFFICE
CERTIFICATE OF CORRECTION

PATENT NO. : 5,838,688
DATED : November 17, 1998
INVENTOR(S) : Jayant KADAMBI et al It is certified that error appears in the above-indentified patent and that said Letters Patent is hereby corrected as shown below: On the title page, and column 1;

In the title, change "NUDES" to --NODES--

NODES--

Signed and Sealed this

Twenty-third Day of March, 1999

Attest:

Q. TODD DICKINSON

*Attesting Officer*     *Acting Commissioner of Patents and Trademarks*